United States Patent
Shelley et al.

(10) Patent No.: US 7,157,717 B2
(45) Date of Patent: Jan. 2, 2007

(54) OPTICAL EMISSION SPECTROSCOPY OF PLASMA TREATED BONDING SURFACES

(75) Inventors: Paul H. Shelley, Lakewood, WA (US); Peter J. VanVoast, Kirkland, WA (US); Thomas A. Dean, Maple Valley, WA (US); Bruce R. Davis, Seattle, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 10/991,694

(22) Filed: Nov. 18, 2004

(65) Prior Publication Data

US 2006/0102847 A1    May 18, 2006

(51) Int. Cl.
*G01N 21/62* (2006.01)

(52) U.S. Cl. .................................................. 250/372
(58) Field of Classification Search ................. 250/372
See application file for complete search history.

(56) References Cited

U.S. PATENT DOCUMENTS

| | | | |
|---|---|---|---|
| 6,720,204 B1 * | 4/2004 | Sudijono et al. ............ 438/106 |
| 7,094,458 B1 * | 8/2006 | Grobe, III .................. 428/64.1 |
| 2003/0232448 A1 | 12/2003 | Shelley et al. |
| 2004/0003828 A1 * | 1/2004 | Jackson ......................... 134/1 |
| 2004/0099806 A1 | 5/2004 | Shelley et al. |
| 2005/0263170 A1 * | 12/2005 | Tannous et al. ............. 134/1.1 |

* cited by examiner

*Primary Examiner*—David Porta
*Assistant Examiner*—Christopher Webb
(74) *Attorney, Agent, or Firm*—MacPherson Kwok Chen & Heid LLP; David S. Park

(57) ABSTRACT

A method and system are provided for real-time contaminant detection and plasma treatment verification during plasma treatment of bonding surfaces. Optical emission spectroscopy (OES) is utilized to determine contamination of a bonding surface prior to the bonding process. OES is further utilized to monitor bonding sites on the bonding surface to verify effectiveness of the plasma treatment.

34 Claims, 4 Drawing Sheets

OPTICAL EMISSION SPECTROSCOPY OF PLASMA TREATED BONDING SURFACES

TECHNICAL FIELD

The present invention relates generally to composite bonding and, more particularly, to an apparatus and process for cleanliness and surface chemistry verification of a composite bonding surface.

BACKGROUND

When processing a material, a measurement of a surface cleanliness (e.g., quantity or quality of contaminant) of the material may be required. For example, verification of an adequate surface cleanliness is useful when bonding surfaces of composite objects to ensure sufficient adhesion or bond strength between composite bonding surfaces. Even low levels of contaminant (e.g., 1 mg/ft$^2$) can greatly reduce the bond strength and cause structural failure.

Sources of contamination on the bonding surface of a composite object include, but are not limited to, contamination after a peel ply material is removed from the bonding surface but prior to application of the adhesive, and application of peel ply material other than what was specified (i.e., application of the wrong type of peel ply material).

Typically, a peel ply material made as a polyester cloth or fabric, is baked onto a bonding surface when the material to be bonded is cured in an autoclave. Prior to bonding, the peel ply material is removed. However, contamination of the bonding surface may occur after the peel ply material is removed, from contaminants such as silicones, teflons, hydraulic oils, lubricants, engine oils, and the like.

Furthermore, the wrong type of peel ply material than specified for the bonding surface may be inadvertently used, causing contamination and a weak bond. For example, residues of silicone-impregnated polyester fabrics (such as the commercially available silicon release blue) and nylon-based fabrics are known to cause weak bonding.

Infrared (IR) spectroscopy has been previously used for surface chemistry measurements and cleanliness verification, as disclosed for example in U.S. patent application Ser. No. 10/329,734 to Shelley et al., published Dec. 18, 2003. However, some surfaces, such as the peel ply bonding surface on graphite epoxy composite materials, are difficult to measure by this method because of roughness and/or absorption characteristics of the surface. Graphite fibers, for example, absorb the light from most spectroscopic methods, such as those using IR light, and are therefore not amenable to IR spectroscopy analysis.

Another previous method of detecting contaminants on composite surfaces has been diamond attenuated total reflectance IR spectroscopy in which a diamond crystal is forced against the surface to be tested (e.g., with about 2,000 pounds of force), and any residue on the surface is transferred to the diamond crystal for measurement. However, this method is highly inefficient as it is slow, tests only a very small area at a time (e.g., 2 mm spot/test), and measurements cannot be made in real-time.

Because the level of a contaminant that is acceptable can differ based upon the particular contaminant and surface to be processed, it is desirable to be able to identify specific individual contaminants on a surface to be processed.

It is known that a bonding surface may be treated with plasma such that the plasma electrons and ions clean and derivatize the surface prior to adding adhesive to the surface. If the surface is not sufficiently treated to the required levels of cleanliness and/or derivation, the composite objects may not properly adhere. Reworking surfaces that have failed to adhere increases the time spent on processing and cost. The rework process may also generate additional waste disposal in many cases.

As a result, there is a need for a sensitive, real-time measurement of surface cleanliness and surface chemistry of composite bonding surfaces to verify effectiveness of the plasma treatment prior to performing the bonding operation.

SUMMARY

Apparatus and methods are disclosed herein to detect surface contaminants as well as to verify surface chemistry of composite bonding surfaces as they are plasma treated. Composite bond strength can be assured by this measurement which will simultaneously verify surface cleanliness, composite material composition, and surface layer chemical species. The present invention may be employed in an in-line production facility or may be used intermittently as desired.

In accordance with one embodiment of the present invention, a method for analyzing a bonding surface is provided, the method including treating a reference surface with plasma to provide a reference spectrum, and treating a bonding surface with plasma to provide a test spectrum. The test spectrum is then compared to the reference spectrum to determine a characteristic of the bonding surface.

In accordance with another embodiment of the present invention, a method for analyzing a bonding surface is provided, the method including treating a reference surface with plasma to provide a reference spectrum and treating a bonding surface with plasma to provide a plurality of test spectrums in real-time. Each of the plurality of test spectrums are then compared to the reference spectrum in real-time to determine a characteristic of the bonding surface.

In accordance with yet another embodiment of the present invention, a system for analyzing a bonding surface is provided, the system including a plasma source for treating a bonding surface with plasma, an optical spectrometer for detecting emissions in the ultraviolet and visible light wavelengths, and an optical interface that delivers an emission signal from proximate the bonding surface to the optical spectrometer. The system may further include a processor coupled to the optical spectrometer and configured to compare the detected emissions with reference emissions.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
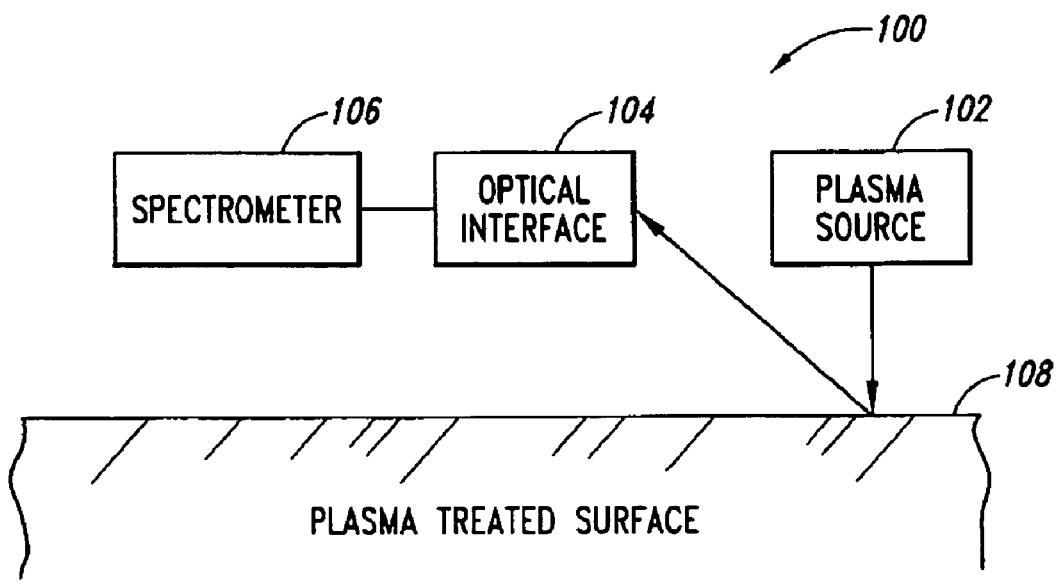
FIG. 1 shows a block diagram illustrating a system for detecting surface contaminants and surface chemistry in accordance with an embodiment of the present invention.

Embodiments of the present invention and their advantages are best understood by referring to the detailed description that follows. It should be appreciated that like reference numerals are used to identify like or similar elements illustrated in one or more of the figures. Furthermore, the figures may not be drawn to scale.

DETAILED DESCRIPTION

In accordance with an embodiment of the present invention, optical emission spectroscopy (OES) is used to analyze plasma and corona flames which treat a bonding surface. OES is a technique by which light emitted from a light source is analyzed to determine which wavelengths are present in the light. When the plasma reacts with the bonding surface, related product species are formed and may be identified by their unique and characteristic optical emission (i.e., atoms in the plasma emit light with characteristic wavelengths for each element). The light may be recorded and calibrated against standards to provide a quantitative and/or qualitative analysis. OES has proven to be very sensitive to silicone release agent residues, nylon peel ply residues, and silicon release blue (SRB) peel ply residues. In accordance with an embodiment of the present invention, OES can also simultaneously detect bonding sites on plasma treated bonding surfaces to monitor the plasma treatment in real-time.

FIG. 1 shows a block diagram illustrating a system 100 for detecting surface contaminants and/or analyzing surface chemistry of composite bonding surfaces in accordance with an embodiment of the present invention. System 100 includes a plasma source 102 for treating a bonding surface 108 with plasma prior to bonding, an optical spectrometer 106 for analyzing light in the ultraviolet (UV) and visible (VIS) spectral ranges, and an optical interface 104 that directs light emissions from proximate bonding surface 108 to optical emission spectrometer 106.

Plasma source 102 provides plasma to treat bonding surface 108 with electrons and ions to remove contaminants (i.e., to clean the surface) and to derivatize the surface (i.e., to add bonding sites) just prior to adding adhesive to the surface. As the plasma treatment proceeds, light is provided on the surface from plasma impingement in two ways: one as a plasma flame, and the other as a corona discharge. In other embodiments, plasma source 102 may include a spark light source. One example of plasma precursor materials include nitrogen and argon, but the use of other precursor materials is within the scope of the present invention.

One suitable example of a plasma source is a plasma treatment head available from PlasmaTreat Corporation of Toronto, Canada. Thus, plasma treatment provides a light source (in one embodiment including corona and plasma light) for OES analysis of a bonding surface.

As the surface is plasma treated, the surface chemical species undergo atomization and ionization in the plasma. The elemental species introduced into the plasma can then undergo electronic transitions that result in the emission of radiation characteristic of the element. Different transitions result in different wavelengths of emission, which can be discriminated by optical systems. Such optics can collect the light and pass it on to a detector for measurement of the emission spectrum.

In one embodiment, optical interface 104 is external to plasma source 102 and is positioned to transmit light emission signals from proximate the surface 108 to optical spectrometer 106 as surface 108 is plasma treated. In one embodiment, the plasma may be viewed from the side of a vertically applied plasma (radial viewing), or alternatively, end-on (axial) of a horizontally applied plasma. In one example, optical interface 104 includes a lens and optical fiber to detect and transmit light emissions to spectrometer 106. The lens and optical fiber allow for precise detection and delivery of light emissions. An example of a suitable optical fiber includes, but is not limited to, laser delivery fibers, which can be made from calcogenide, heavy metal fluoride, polycrystalline silver halide thallium halide single-crystal sapphire, and silica. However made, optical interface 104 should be able to detect and deliver desired light free from inhibitive distortion. Optical interface 104 should also have sufficient durability to permit long exposure to high levels of UV energy and heat or cold without damage. Appropriate lenses and optical fibers are available from Ocean Optics, Inc. of Dunedin, Fla.

Optical spectrometer 106 is operably coupled to optical interface 104 and capable of measuring the intensity of the optical emission signals received from optical interface 104 to provide a spectrum in the UV and VIS wavelengths. Spectrometer 106 is optimized for measurement of contamination in the cleaning plasma that could degrade the bond strength of the composite bond as well as surface species created by the plasma cleaning process that can promote the adhesion of the composite bond. Spectrometer 106 is further capable of providing real-time spectra as emission signals are received. In one embodiment, spectrometer 106 can also be used to select or filter certain frequencies from the optical emissions. In other embodiments, frequencies may be selected or filtered by optical interface 104. An example of optical spectrometer 106 is the Model HR2000 High-resolution Miniature Fiber Optic Spectrometer from Ocean Optics, Inc. of Dunedin, Fla. However, it should be appreciated that various spectrometers may be used to analyze the received light.

In a further example of a light detection system that may be used, plasma light is collected via a UV transparent optical fiber and brought into the spectrometer, where the light diffracts off a diffraction grating and is dispersed into its components. The dispersed light falls onto a linear photodetector array which measures the light intensity. The result of this is a measurement of light intensity as a function of wavelength (each position on the linear array corresponding to a different wavelength) which is sampled simultaneously.

Other methods that may be used to analyze the spectral content of the emitted light include the use of a single optical detector (e.g., a photomultiplier tube) which is scanned over a range of frequencies (e.g., a "scanning monochrometer"), and the use of a single detector in combination with an optical bandpass filter.

Accordingly, the light emissions from plasma treatment of a bonding surface may be monitored by optical emission spectroscopy to detect low levels of contaminants and/or chemical species representing bonding sites to verify effective plasma treatment of the bonding surface.

If contaminants are detected, the surface area may be plasma treated multiple times until a standard of cleanliness is achieved or the composite material may be taken out of production. If the plasma treatment is not effectively creating bonding sites, the treatment process may be altered and/or stopped, thereby more efficiently producing composite bonds in a manufacturing process rather than reworking surfaces that have failed to bond.

In accordance with an embodiment of the present invention, system 100 is capable of measuring a relatively large area swath along the plasma treated surface as a plasma treatment head moves along the surface, thereby providing sensitive real-time measurements in an efficient manner. In one example, a single plasma treatment head may treat and/or measure an area of approximately one-inch diameter. In another example, an array of approximately five plasma treatment heads may treat and/or measure an approximately four-inch wide swath along the plasma treated surface. It will be apparent that one or more plasma treatment heads may be used to treat and/or measure different amounts of surface area.

Surface 108 may be comprised of a variety of materials, including but not limited to graphite epoxy, metals, and dielectrics. Surface 108 may absorb infra-red light in one embodiment. However, it should be appreciated that the present invention can be used on other surfaces without departing from the spirit of the invention.

Figure 2:
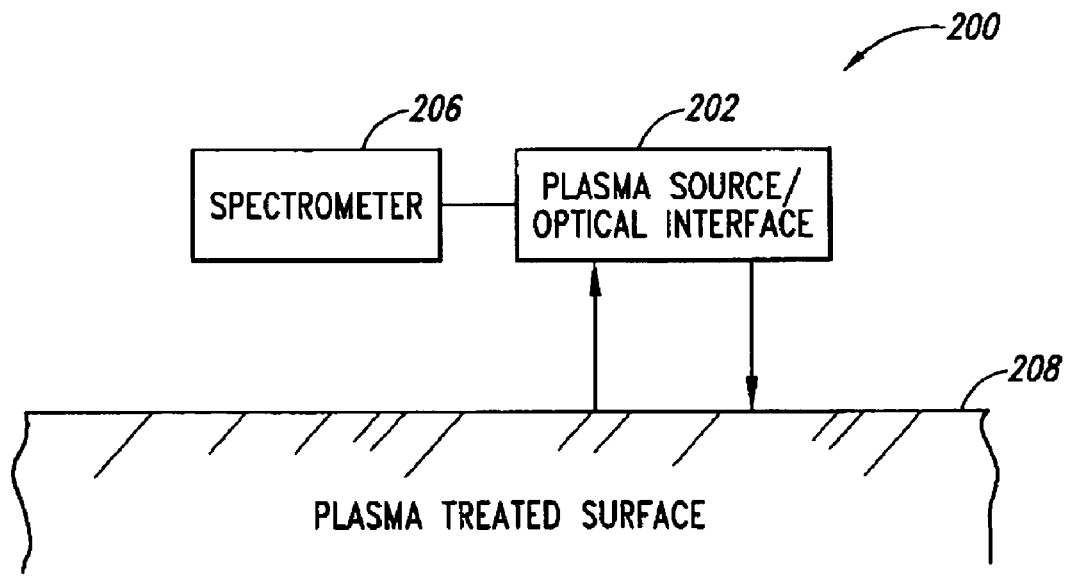
FIG. 2 shows a block diagram illustrating a system for detecting surface contaminants and surface chemistry in accordance with another embodiment of the present invention.

FIG. 2 shows a block diagram illustrating a system 200 for detecting surface contaminants in accordance with another embodiment of the present invention. In this embodiment, the optical interface and the plasma source are integrated in the same housing. System 200 includes a plasma treatment head 202 having both a plasma source and an optical interface, and a spectrometer 206 operably coupled to plasma treatment head 202. The components of system 200, such as the plasma source, optical interface, and optical spectrometer, operate individually in a similar manner as described above with respect to system 100. However, in this embodiment, the optical interface for light emission detection and transfer moves with and is adjacent to the plasma source. In one example, the plasma may be viewed end-on (axial) from a vertically applied plasma.

Figure 3A:
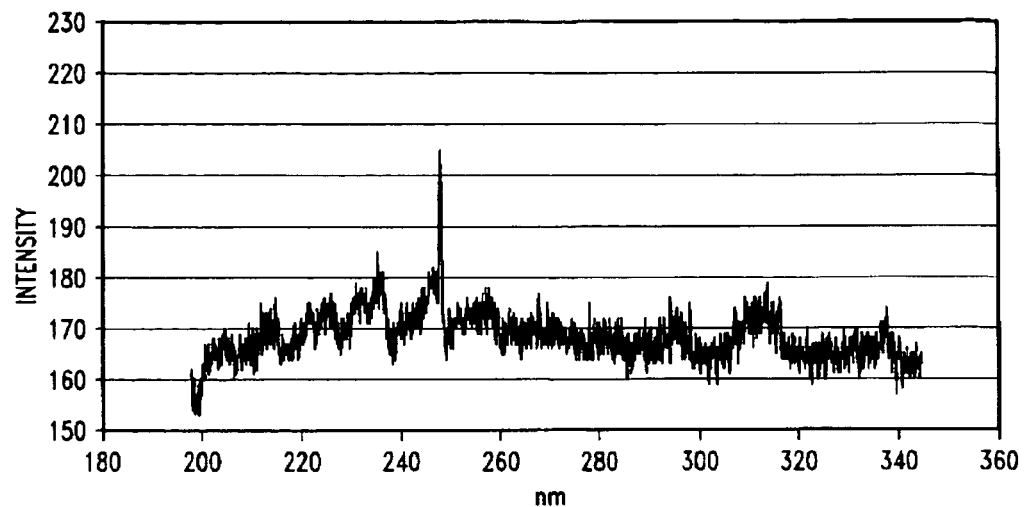
FIGS. 3A through 3C illustrate ultraviolet (UV) wavelength spectrums with and without contaminants in accordance with an embodiment of the present invention.
Figure 3B:
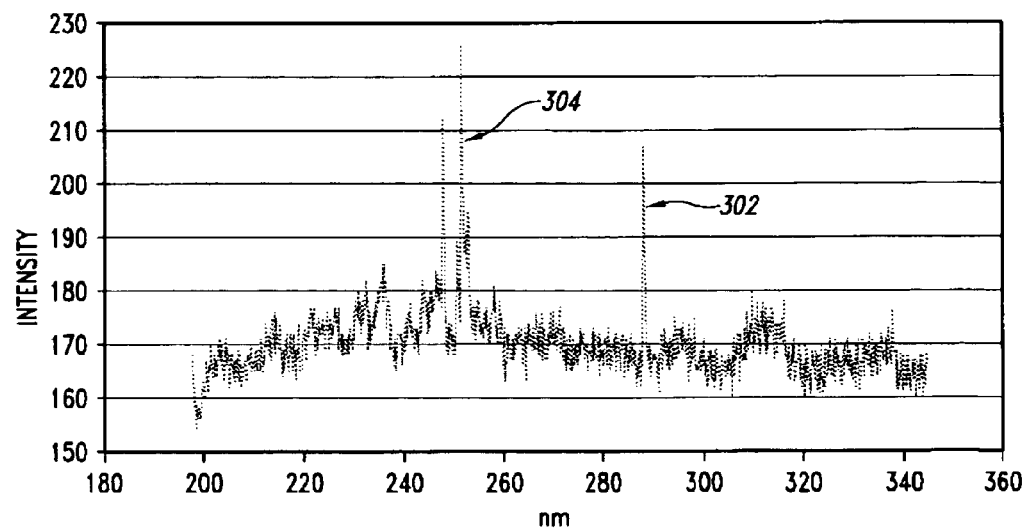
Figure 3C:
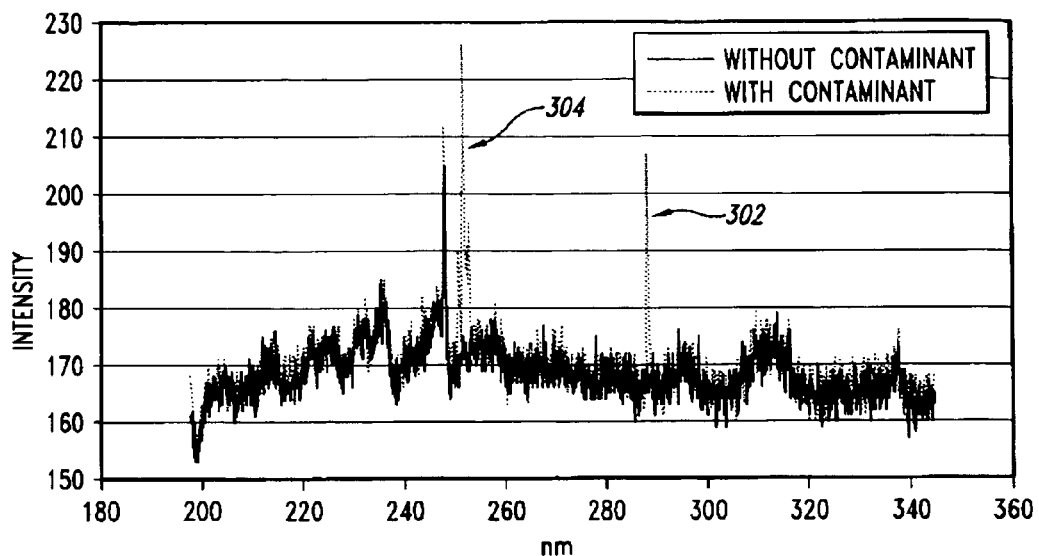

FIGS. 3A through 3C illustrate examples of UV spectrums with and without silicon release agent contaminants, in accordance with an embodiment of the present invention. Wavelength is shown along the X-axis in nanometers and intensity is shown along the Y-axis. FIG. 3A shows a baseline or reference spectrum in which a standard peel ply was used on the bonding surface. FIG. 3B shows a spectrum in which a peel ply with a Frekote® release agent contaminant was used on the bonding surface. Elemental silicon lines 302 and 304 from the contaminants are shown. It is noted that FIG. 3B may either represent a sample or test spectrum, or in the alternative, a calibration spectrum for the Frekote® contaminant. FIG. 3C shows the baseline spectrum of FIG. 3A and the contaminant spectrum of FIG. 3B superimposed to highlight the contaminant silicon emission lines 302 and 304.

In accordance with another embodiment of the present invention, systems 100 and 200 as described above are not only capable of detecting contaminants but are also capable of verifying effective plasma treatment of the bonding surface. The present invention allows for determination of the adequacy of the plasma source and the addition of bonding sites on the composite material surface while the surface is plasma treated. Bonding sites are typically in the form of oxygenated chemical species, such as hydroxy groups (—OH) and ketone groups (—C=O), and are detectable by the present invention. Indication of new bonding sites or change in the intensity of existing bonding sites over time during the plasma treatment process provide a real-time indication of the plasma treatment progress. When the intensity of chemical species indicating bonding sites approaches a predetermined value or, alternately, approaches a stabilized value that has stopped appreciably increasing, the plasma treatment process may be considered complete. Accordingly, the plasma treatment process can be monitored in real-time by tracking spectral emissions corresponding to reaction components related to bonding sites.

Figure 4:
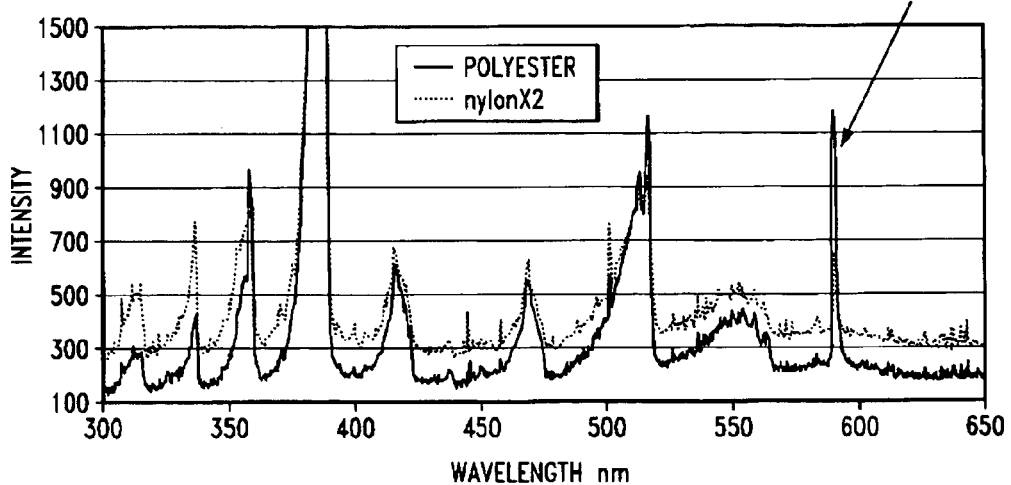
FIG. 4 illustrates a visible (VIS) wavelength spectrum showing additional bonding sites in accordance with an embodiment of the present invention.

FIG. 4 illustrates a UV/VIS wavelength spectrum showing additional bonding sites in accordance with an embodiment of the present invention. Wavelength is shown along the X-axis in nanometers and intensity is shown along the Y-axis. FIG. 4 shows a spectrum of a polyester peel ply on a bonding surface by a solid line and a nylon peel ply on the bonding surface by a dashed line. The emission line at 588 nm is much larger for polyester peel ply surfaces versus nylon peel ply surfaces, which evidences a larger amount of oxygenated species on the polyester surface which lead to greater bond strength.

Figure 5:
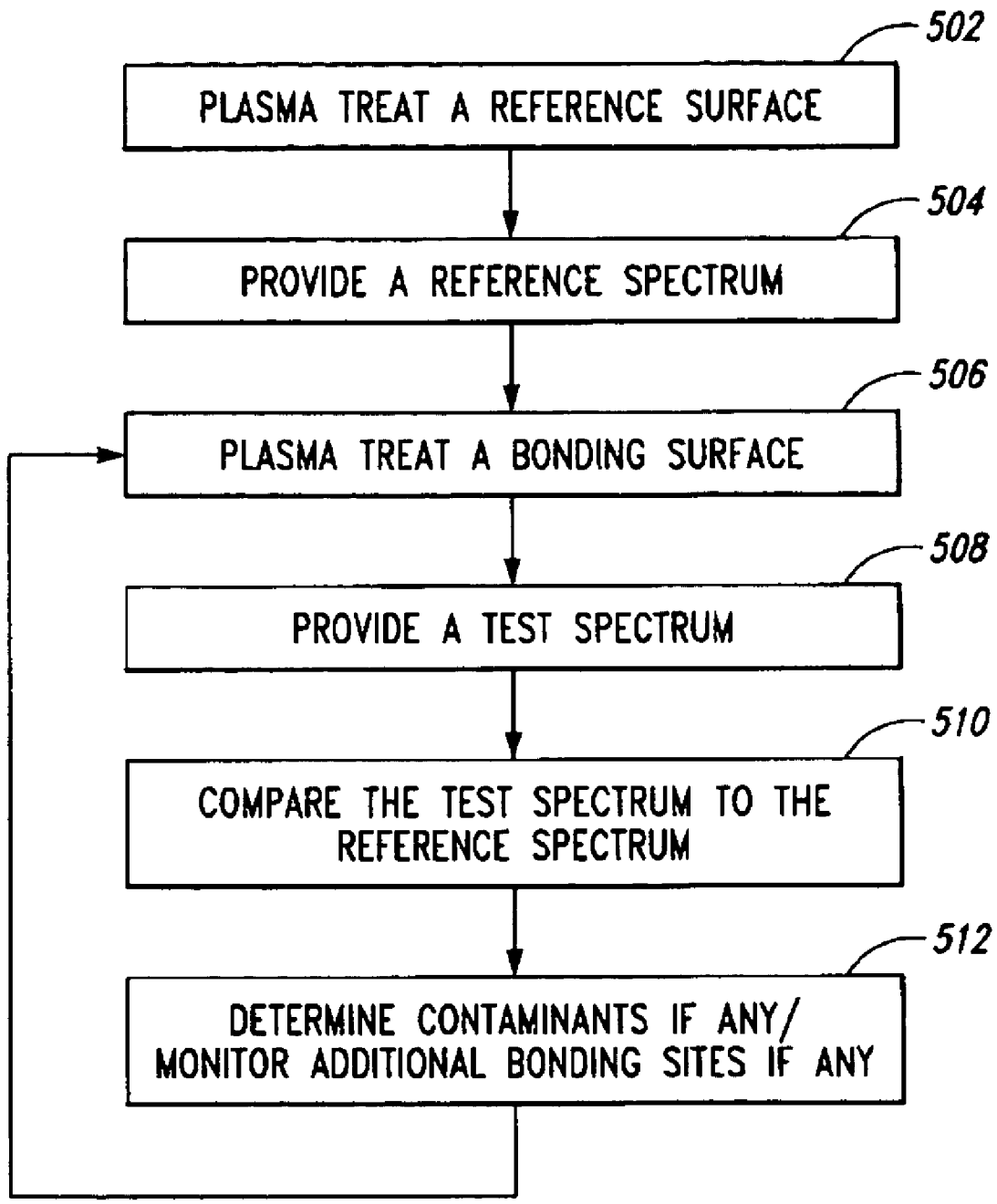
FIG. 5 shows a flowchart of a method of analyzing bonding surfaces for detection of contaminants and surface chemistry in accordance with an embodiment of the present invention.

Referring now FIG. 5 in conjunction with FIGS. 3A–3C and 4, FIG. 5 shows a flowchart of a method of detecting surface contaminants and monitoring surface chemistry in accordance with embodiments of the present invention.

A method includes steps for determining a reference spectrum as indicated by blocks 502 and 504. A baseline or reference standard is a standard that is representative of the surface that is to be tested (e.g., 108 and 208) and has a level of a particular contaminant below a predetermined quantity which can be considered to be clean or free from the contaminant. In one embodiment, the reference standard has a contaminant level less than or equal to about 0.01 mg/ft$^2$. Also, the reference standard has a similar surface finish and composition as that of the surface to be tested. For example, a composite material comprised of plastic or dielectric material including a quantifiable or known amount of peel ply fabric freshly removed can be used as a reference surface to provide a reference spectrum for a type of bonding surface. It should also be appreciated that other parameters for measurement are maintained substantially similar as in contamination or surface chemistry determination to obtain accurate reference spectrums.

The first step in determining baseline/reference spectrums is to treat a reference surface with plasma as indicated at block 502. Light emissions from the treatment process are detected and transmitted by the optical interface to the UV/VIS spectrometer which provides and saves a reference spectrum (e.g., in a database) as indicated at block 504.

After determining the reference spectrum, the system of the present invention may be calibrated to determine a relationship between a spectrum (intensity and wavelength values) and a quantity of contaminant on a surface. In one embodiment, the calibration is provided by obtaining spectrums from plasma treatment of bonding surfaces with differing amounts of known quantities of a contaminant, thus developing sufficient data points to determine a relationship between spectrum intensity and wavelength and the quantity of the contaminant. In one example, these calibration standards can be made by precisely weighing a contaminate free sample of the surface to be tested, applying a contaminant to the sample and weighing the sample with the contaminant. The difference in weight between the sample with and without the contaminant is the amount of contaminant on the sample. The standards may be light and/or thin to more accurately detect small weight differences. The standards are otherwise made such that the amount of contaminant applied to each standard is carefully applied and measured. The amount of contamination is calculated for each sample, typically in milligrams per square foot ($mg/ft^2$), and can then be used as a calibration standard to obtain calibration spectrums.

The compilation and manipulation of spectrums, including but not limited to reference and calibration spectrums, real-time sample or test spectrums, and subtracted or superimposed spectrums, are suitably performed in a number of acceptable ways. For example, in one embodiment, compilation and manipulation of spectrums are performed by a processor or micro-processor (not shown) arranged to perform mathematical operations. The processor may be suitably included within the spectrometer or may be suitably provided as a stand-alone unit that is electrically connected to receive data from the spectrometer.

After obtaining the reference spectrums (and the calibration spectrums in some embodiments), systems 100 and 200 are ready to begin the measurement process to determine bonding surface cleanliness and/or surface chemistry. The bonding surface to be tested or monitored is plasma treated as indicated in block 506 and a test spectrum is provided via the optical interface and spectrometer, as indicated in block 508. The test spectrum is then compared to the reference spectrum, as indicated in block 510. Based upon the comparison, surface cleanliness may be determined by the measurement of any signature chemical groups related to contaminants. Also based upon the comparison, plasma treatment of the surface may be verified by the detection of additional bonding sites determined by a spectrum portion representing an oxygenated chemical species, for example hydroxy and ketone groups. The determination of contaminants and verification of effective plasma treatment is indicated in block 512. The process may be continued with a return to block 506 as the bonding surface is further plasma treated, or the process may end.

Embodiments described above illustrate but do not limit the invention. It should also be understood that numerous modifications and variations are possible in accordance with the principles of the present invention. Accordingly, the scope of the invention is defined only by the following claims.

We claim:

1. A method for analyzing a bonding surface, the method comprising:
    treating a reference surface with plasma to provide a reference spectrum;
    treating a bonding surface with plasma to provide a test spectrum; and
    comparing the test spectrum to the reference spectrum to determine a characteristic of the bonding surface.
2. The method of claim 1, wherein the reference spectrum is based on an emission signal from plasma treatment of the reference surface with contaminants below a standard level.
3. The method of claim 1, wherein the bonding surface is a composite bonding surface.
4. The method of claim 1, wherein the bonding surface is comprised of a graphite epoxy material.
5. The method of claim 1, wherein the bonding surface absorbs infrared light.
6. The method of claim 1, wherein the plasma is formed from nitrogen and argon precursor gases.
7. The method of claim 1, wherein the test spectrum is in the ultraviolet and visible light wavelengths.
8. The method of claim 1, wherein the characteristic of the bonding surface includes an amount of bonding sites.
9. The method of claim 1, wherein the characteristic of the bonding surface includes whether additional bonding sites have been created.
10. The method of claim 9, wherein the additional bonding sites are determined by a spectrum portion representing an oxygenated chemical species.
11. The method of claim 10, wherein the oxygenated chemical species is selected from the group consisting of hydroxy groups and ketone groups.
12. The method of claim 1, wherein the characteristic of the bonding surface includes whether the surface is contaminated.
13. The method of claim 1, further comprising providing a plurality of test spectrums over time.
14. The method of claim 13, wherein each of the plurality of test spectrums is compared to the reference spectrum in real-time.
15. The method of claim 1, further comprising treating a plurality of calibration surfaces with plasma to provide a plurality of calibration spectrums.
16. A method for analyzing a bonding surface, the method comprising:
    treating a reference surface with plasma to provide a reference spectrum;
    treating a bonding surface with plasma to provide a plurality of test spectrums in real-time; and
    comparing each of the plurality of test spectrums to the reference spectrum in real-time to determine a characteristic of the bonding surface.
17. The method of claim 16, wherein the reference spectrum is based on an emission signal from plasma treatment of the reference surface with contaminants below a standard level.
18. The method of claim 16, wherein the bonding surface is a composite bonding surface.
19. The method of claim 16, wherein the bonding surface is comprised of a graphite epoxy material.
20. The method of claim 16, wherein the bonding surface absorbs infrared light.
21. The method of claim 16, wherein the plurality of test spectrums is in the ultraviolet and visible light wavelengths.
22. The method of claim 16, wherein the characteristic of the bonding surface includes an amount of bonding sites.
23. The method of claim 16, wherein the characteristic of the bonding surface includes whether additional bonding sites have been created.
24. The method of claim 23, wherein the additional bonding sites are determined by a spectrum portion representing an oxygenated chemical species.
25. The method of claim 24, wherein the oxygenated chemical species is selected from the group consisting of hydroxy groups and ketone groups.
26. The method of claim 16, wherein the characteristic of the bonding surface includes whether the surface is contaminated.
27. A system for analyzing a bonding surface, comprising:
    a plasma source for treating a bonding surface with plasma;
    an optical spectrometer for detecting emissions in the ultraviolet and visible light wavelengths; and
    an optical interface that delivers an emission signal from proximate the bonding surface to the optical spectrometer.
28. The system of claim 27, wherein the plasma source includes a light source selected from the group consisting of a flame, spark, and corona discharge.

29. The system of claim 27, wherein the plasma source includes both a flame and a corona discharge.

30. The system of claim 27, wherein the surface is comprised of a graphite epoxy material.

31. The system of claim 27, wherein the surface absorbs infrared light.

32. The system of claim 27, wherein the optical interface includes a lens and a fiber optic cable.

33. The system of claim 27, wherein the optical interface is integrated with the plasma source.

34. The system of claim 27, further comprising a processor coupled to the optical spectrometer and configured to compare the detected emissions with reference emissions.

* * * * *